US006338137B1

(12) United States Patent
Shiell et al.

(10) Patent No.: US 6,338,137 B1
(45) Date of Patent: Jan. 8, 2002

(54) DATA PROCESSOR HAVING MEMORY ACCESS UNIT WITH PREDETERMINED NUMBER OF INSTRUCTION CYCLES BETWEEN ACTIVATION AND INITIAL DATA TRANSFER

(75) Inventors: Jonathan H. Shiell; Patrick W. Bosshart, both of Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/314,763

(22) Filed: May 19, 1999

Related U.S. Application Data

(60) Provisional application No. 60/087,263, filed on May 29, 1998.

(51) Int. Cl.$^7$ ............................................. G06F 9/312
(52) U.S. Cl. ......................... 712/225; 710/58; 710/59; 711/167
(58) Field of Search .................... 712/225; 711/167; 710/58, 59

(56) References Cited

U.S. PATENT DOCUMENTS 5,673,233 A * 9/1997 Wright et al. ............... 365/233
5,729,766 A * 3/1998 Cohen .......................... 710/58
5,826,106 A * 10/1998 Pang ............................ 710/25
6,023,776 A * 2/2000 Ozaki .......................... 714/55

* cited by examiner

Primary Examiner—Kenneth S. Kim
(74) Attorney, Agent, or Firm—Robert D. Marshall, Jr.; W. James Brady, III; Frederick J. Telecky, Jr.

(57) ABSTRACT

A multiple cycle memory access unit issues a memory access load or store, delaying a predetermined number of instruction cycles between it activation and its initial data transfer. The multiple cycle memory access unit controls a predetermined plural number of accesses and operates independently and in parallel with the instruction flow of the data processor. The multiple cycle memory access unit delays a predetermined number of instruction cycles between sequential data transfers of the predetermined number of data transfers. This predetermined period may be the same as the initial delay or it may be determined independent of the initial delay. The operation of the multiple cycle memory access unit is subject to predication on an instruction specified data registers. The multiple cycle memory access unit preferably provides predetermined register number cycling among the plural data registers. The multiple cycle memory access unit preferably aborts operation, stops and saves its internal state on a predetermined event.

32 Claims, 2 Drawing Sheets

DATA PROCESSOR HAVING MEMORY ACCESS UNIT WITH PREDETERMINED NUMBER OF INSTRUCTION CYCLES BETWEEN ACTIVATION AND INITIAL DATA TRANSFER

This application claims priority under 35 USC §119(e)(1) of Provisional Application No. 60/087,263, filed May 29, 1998.

TECHNICAL FIELD OF THE INVENTION

The technical field of this invention is control of data transfers between data registers of a data processor and its associated data memory.

BACKGROUND OF THE INVENTION

The concept of a single computer instruction causing a multiple memory accesses dates back at least to the IBM 370 series main frames, where they are called the load multiple or store multiple instructions (LM and STM). They are used to do fast bulk saves and restores of the contents of the register file. These instructions operate on a specified range of registers and attempt to operate as fast as possible. In the IBM 370 these instructions only stall if the data cache is busy. The number of registers operated on per cycle varies depending on the machine model, up to 4 registers per cycle for some latter models. The IBM 370 computer architecture does not support predication of these instructions.

Reduced instruction set computers (RISC), such as the PA-RISC architecture, typically support predicated operations. These RISC data processors replace the multicycle LM/STM type of instructions with groups of multiregister load and store instructions.

In VLIW systems, such as the TMS320C62x/C67x family of processors of Texas Instruments, adding some additional basic functionality to a D (load/Store) unit is almost free. In this case the D unit can provide additional computational power for inner loops when it is not doing loads or stores. The problem is that in some case you would like to use more of the D units time for non-storage work but still maintain control of the data flow from memory into and out of the register file.

SUMMARY OF THE INVENTION

This invention is a data processor operating in instruction cycles including an instruction permitting delayed memory accesses. A multiple cycle memory access unit issues a memory access delaying a predetermined number of instruction cycles between its activation and its initial data transfer. These memory accesses could be loads (data transfer from data memory to a central processing unit data register) or stores (data transfer from a data register to memory). In the preferred embodiment the multiple cycle memory access unit controls a predetermined plural number of such accesses. These accesses preferably are performed independently and in parallel with the instruction flow of the data processor, once the multiple cycle memory access unit has been activated.

The multiple cycle memory access unit delays a predetermined number of instruction cycles between sequential data transfers of the predetermined number of data transfers. This predetermined period may be the same as the initial delay or it may be determined independent of the initial delay.

The operation of the multiple cycle memory access unit is subject to predication on an instruction specified data registers. The operation subject to predication aborts upon detection of a predetermined state in the instruction specified data register. The operation subject to predication could be the data memory accesses or the actual data writes, or both. The multiple cycle memory access unit may abort the predicated operation on predication failure and continue with the next operation or abort the predicated operation and stop operation.

The multiple cycle memory access unit preferably provides predetermined register number cycling among the plural data registers. This cycling could be between an instruction specified data register and the next data register. Double word operations could be between two register pairs. The register cycling could begin with an instruction specified data register and cycle to a next higher data register number either with or without wrapping at the highest register number. The register cycling could begin with an instruction specified data register and cycle to a next lower data register number either with or without wrapping at the lowest register number.

The multiple cycle memory access unit preferably aborts operation and stops on a predetermined event, such as an external interrupt, an internal interrupt, a forward branch taken or a subroutine call. On such an aborted operation, the internal state of the multiple cycle memory access unit is saved into instruction visible and alterable memory. This instruction visible memory preferably includes control registers.

The multiple cycle memory access unit can be enabled and disabled by via instructions or bits in a control register. The multiple cycle memory access unit is loaded and activated by at least one special instruction or by a normal instruction in a special mode.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
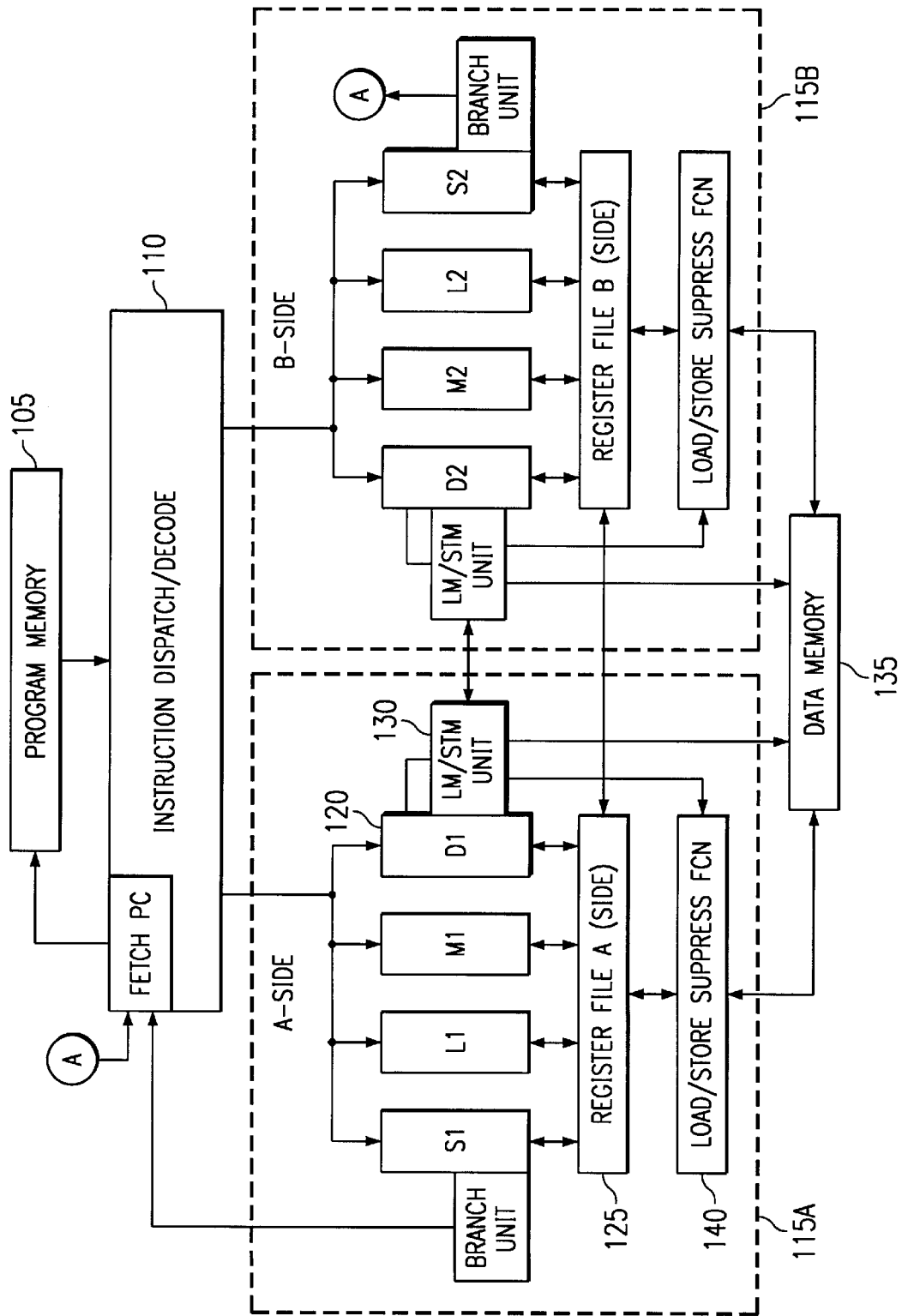
FIG. 1 shows a simplified drawing including an exemplary digital signal processor core including this invention plus program and data memories.

The preferred embodiment shown in this patent is based on, and assumes a basic knowledge of, the Texas Instruments TMS320C62x/C67x family of processors, here-in-after referred to as the C6x processors or a C6x. For more information see the "TMS320C62x/C67x CPU and Instruction Set, Reference Guide" and the "TMS320C62x/C67x Technical Brief" both from Texas Instruments, both of which are herein incorporated by reference. For ease of explanation in the following some of the addressing extensions that are part of the C6x specification have been dropped, to add them or other extensions on, should be straight forward to one skilled in the art.

Below is the format of the normal C6x Load and Store instructions, and an example of their use:

Bits Field
- 31–28: creg field and z bit, the creg field selects the register upon which the operations are to be predicated and the z bit determines if a value of zero is treated as predication go/fail.
- 27–23: dst/src field, provides the dst (for loads) or src (for stores) register number (0 to 15, only 4 bits used).

22–18: baseR indicates which register is to be used as the base register for addressing data memory 17–13: offsetR/ucst5, depending on the value of a bit in the mode field this field contains either: the address of the register which contains the offset, or the field is used as a 5 bit unsigned constant which is multiplied by the operand size and the result is then used as the offset.

12–9: mode, controls the address generation options, such as linear, circular etc., see the "TMS320C62X/C67x CPU and Instruction Set, Reference Guide" for details 8–2: (r, y, ld/st, 01) These fields are not relevant to this invention. These fields determine which side (A or B) the operation is for along with the operand size and the operation (load vs. store). Note: that 1d/st is a 3 bit field, the rest single bit.

1: s bit selects side A or B for destination

0: p bit indicates if the next instruction can be issued in parallel with this one.

| Instr. | Unit & Side | Args. | Commment |
|--------|-------------|-------|----------|
| LDW | .D1 | *-A5[4], A6 | ; Load into register A6 a word from memory |
| STB | .D2 | *+B1, B9 | ; Store the low byte of B1 in memory |

From the basic load or store instruction information (and the register files) the CPU generates (at least) the following information:

Memory starting address (via the baseR and offsetR/ucst5 fields)

The register upon which to predicate the operation (from the z and creg fields)

Source register for stores and destination register for loads (from the dst field)

Type of operation (load Vs store, constant Vs offset reg, addressing mode, etc.)

In the preferred embodiment of this invention has two specific instructions; load multiple (LDMx) and store multiple (STMx). Other numbers of instructions, such as one (with the selection of load or store made by a source other than the opcode, for example) are also possible. In addition it is also possible that instead of implementing specific new instructions (and possibly enable/disable logic), to implement a new mode to the normal Load and Store instructions. In such a case, the normal Load and Store instructions (LDx and STx) are reinterpreted to perform the same functions as the new instructions (LDMx and STMx) of this invention.

The load multiple (LDMx) and store multiple (STMx) instructions of this invention have the same instruction format as the normal C6x Load/Store instructions. Note that x is one of: B (byte), H (halfword), W (word) or D (doubleword), indicating the data size of the data transfer. For the LDMx and STMx instructions additional information is supplied from either a control register (the preferred case for the C6x), or a fixed general register (say A12 or B12), or other equivalent structure. An example of the register format of this additional information (in this case for Loads) and an encoding of it's contents is as follows:

Bits Field

31–24: Number of Accesses (loads or stores) to Issue (0 to 255)

23–22:—reserved

21–16: Number of Cycles to Wait Between Accesses (0–63)

15–12: Number Cycles to Wait until First Access issued (0–15)

11:—reserved

10: Base Register Update Control
   0: No update
   1: Update at termination of operation 9: Issue Delay Control
   0: delay between every issue
   1: delay every other issue 8: Memory Address Change Control
   0: Don't change memory address
   1: Change memory address for each access (as per mode field)

7–5: Register Number Sequencing
   000: Don't change register number
   001: Ping-Pong between 2 sets (n & n+2, no wrap)
   010: Decr. register number, no wrap
   011: Incr. register number, no wrap
   100: Decr. register number, wrap back to dst/src
   101: Incr. register number, wrap back to dst/src
   110: Decr. register number, wrap around to 15
   111: Incr. register number, wrap around to 0

4–2: Stop Control
   xx1: Stop on Predication fail
   x1x: Stop on Forward branch taken
   1xx: Stop on Interrupt (or exception/fault) (where x is don't care)

1–0: Predication Control
   00: Predication only at start
   01: Predicate each "Load/Store" issue
   10: Predicate each register/memory write
   11: Predicate at both issue and write The Number of accesses to issue Field specifies from 0 to 255 accesses to be issued by the LDM/STM unit. The value 0 is special and means continue operation until a stop condition is reached as specified by the Stop control field. As further described below, this would normally include a Stop on Predication fail. If there is a need to handle an inner loop which runs more then 255 iterations which can't use the 0 value, then this field, like all the other count fields, could be expanded as needed. It is possible to specify this number via a different 32 bit control register, for example.

The Number of Cycles to Wait Between Accesses Field specified the number of instruction cycles, from 0 to 63, between accesses. In normal use this count is set to the length (in cycles) of the inner loop, thus the accesses always appear to come in the same instruction cycle of the inner loop. Note, this field can also be setup to issue accesses at fixed points in the inner loop. For example, if the inner loop is 10 instruction cycles and this field is set to 5, (with the Issue delay control field described below set to no delay, and the Number cycles to wait till first access issued Field set such that the first access is issued at inner loop instruction cycle 1), then every iteration of the loop the unit will issue an access at cycle 1 and cycle 5. If the Issue delay control Field is set to wait every other issue, then four accesses would be issued each loop. In this case the Number of cycles to wait between accesses Field would need to be adjusted down to 4 to account for the second access which would generally reload the wait counter. It would be possible to have a system where the second access didn't affect the counter, (then the count could be left at 5), in this case accesses would be issued at cycles 1, 2 and 5, 6.

The Number Cycles to Wait Until First Access Issued Field is the count of instruction cycles, from 0 to 15, to wait between the issuing of the instruction and the first access issued from the LDM/STM unit. This allows the LDM (or STM) instruction to be issued at a convenient place in the inner loop setup code and delay the start of the unit operation until the proper cycle within the inner loop. Note some systems may omit this field and instead either have a fixed waiting period (including none) before the first access or use the Number of Cycles to Wait Between Accesses Field also specify the initial waiting period.

The Base Register Update Control Field determines if the base address register designated by the instruction is updated with the final contents of the address register in the LDM/STM unit when the operation terminates. This termination could be due to either the Number of accesses to issue going to zero (i.e. operation finished normally) or a Stop control condition that terminates the operation (abnormal or early termination). For 0: no update, the base address register is not changed upon termination of the operation. For 1: update at termination of operation, the operation looks outside the loop as if the "replaced load/store instruction(s)" had an auto-increment feature selected. Note that if one desires this field could be expanded to add the option of "Update base register after every access", at the cost of adding additional complexity to the system. This would allow the inner loop to see the updates in real time (with the possible exception of not allowing for bypassing).

The Issue Delay Control Field allows the programmer to select how the delay should be applied. If 0: delay every cycle is specified, an access will occur with the specified Number of cycles wait between accesses, (i.e. access 1, wait, access 2, wait, access 3, etc.). If 1: delay every other cycle is specified, then each pair of accesses will appear to come from back-to-back Loads (or Stores) in the loop (i.e. access 1, access 2, wait, access 3, access 4, wait, etc.), the wait appearing between the pairs. This field could be expanded to allow larger issue groups between waits, for example a two bit field could be defined as 00 and 01 same as 0 and 1 above, 10 delay every third issue and 11 delay every fourth issue. Doing so would also require an expansion of the internal state of the unit.

The Address Change Control Field determines if the memory address changes with each access.

A value of 0, Don't change memory address, continues to use the same address.

A value of 1, Change memory address changes the memory address within the LDM/STM unit for each access as it would for a normal LDMx or STMx instruction.

The Register Access Sequencing Field determines how the destination (or source for stores) register number changes with each access:

A value of 00: Don't change register number, uses only the instruction specified register or two registers if the operation employs a doubleword operand.

A value of 01: Ping-Pong between 2 sets uses the instruction specified register number n and the next register number n+1 for accesses of length word or less. For accesses specifying a doubleword, this uses the register pair starting at the instruction specified register number n and the register pair stating at register number n+2. In either case there is no wrap. An example of a Ping-Pong between 2 register sets would be a LDMD (load multiple doubleword), which would load an even-odd pair of registers from memory. If the instruction specified register A8 as the initial destination register, the first load would load registers A8 and A9; the second load would load registers A10 and A11; and the third would use registers A8 and A9 again.

A value of 010: Decrement register number (no wrap), each access causes the register number to be decremented by 1 (or 2 if a doubleword access) until the lowest register number (register number 0 in the preferred embodiment) is reached. Once reaching register number 0, the decrementing stops. Any following accesses employ register number 0.

A value of 011: Increment register number (no wrap), each access causes the register number to be incremented by 1 (or 2 if a doubleword access) until the greatest register number (register number 15 in the preferred embodiment) is reached. Once reaching register number 15, the incrementing stops. Any following accesses employ register number 15.

A value of 100: Decrement register number (wrap to dst/src), is the same as a value of 010, except that the address wraps back to the instruction specified dst/src register after reaching the lowest register number (register 0). Any following accesses decrement from the instruction specified register.

A value of 101: Increment register number (wrap to dst/src), is the same as a value of 010, except that the address wraps back to the instruction specified dst/src register after reaching the greatest register number (register number 15) Any following accesses increment from the instruction specified register.

A value of 110: Decrement register number (wrap to 15), is the same as a value of 010, except that the address wraps around to greatest register number (register number 15) after reaching the lowest register number (register number 0).

A value of 111; Increment register number (wrap to 0), is the same as a value of 010, except that the address wraps around to lowest register number (register number 0) after reaching the greatest register number (register number 15).

The Stop Control Field allows the LDM/STM unit to be stopped early when and unexpected or early termination condition occurs.

A value of xx1: The Stop on Predication fail, causes the unit to stop when the selected predication condition fails. The unit will stop issuing any new accesses (ones in flight will finish) and wait for further orders.

A value of x1x: Stop on Forward branch taken, is the same as xx1, except that the stop in this case occurs because a forward branch has been taken. A forward branch is one with a positive offset from the branch program counter. This type of branch is often used for an error exit from a loop, as opposed to a backward branch which normally closes a loop.

A value of 1xx: Stop on Interrupt (or exception/fault), is the same as xx1, except that any interrupt either internal (an access exception for example) or external (an I/O interrupt for example) causes the stop.

The function provided by the Stop Control Field is required either explicitly as here or it could be implied. But in either case you normally wouldn't want this unit to be running after any of these events. Note that it is possible to add controls to allow suppressing (i.e. convert the operation to a no-op) of an access that got an exception, instead of stopping, and even writing a predetermined value or the error information instead of the data, if a write was desired. Of course one could add other control flow alteration events to this field such as backward branch not taken or subroutine call or return, or non-control flow state such as a carry bit being set or cleared.

The Predication Control Field allows the use of predication to be extended to each access issued by the LDM/STM unit:

A value of 00: Predication only at start, causes the instruction to act like a normal C6x instruction, i.e. only the initial issue of the instruction is subject to predication (if it fails then the operation is effectively a no-op).

A value of 01: Predicate each "Load/Store" issue, extends the normal C6x predication into the LDM/STM unit so that the accesses issued by the LDM/STM unit act as if they were issued by individual predicated instructions, i.e. each access the cycle it is to be issued is subject to predication just as if it was issued by a D unit.

A value of 10: Predicate each register/memory write, also extends predication into the LDM/STM unit. But in this case unlike in the normal C6x, the predication only affects the final write of the data (into the register or memory).

A value of 11: Predicate at both issue and write, combines the effects of both the 01 and 10 values so that an access is predicated at both access issue and final data write.

Note that in some systems the timing of stores requires that the store data be presented to the memory the same cycle as the address (instead of one or more cycles later) in which case the two options above (01 and 10) are redundant for stores. This is also true for loads where the memory can do the access in a single cycle. The one exception to this is if there is a pipeline delay, in which case the two options could be reinterpreted as 01 predicate on issue and 10 predicate the write.

Also if the Stop control field doesn't specify stop on predication fail then the LDM/STM unit will for the options other than 00, suppress/nullify the specific operation (issue of an access or the data write) and then continue on with the next access.

Again, for ease of explanation not all possible options known in the art have been shown, such as circular addressing mode(s) for the Register access sequencing and Address change control fields, multiple stop control bits for different interrupts, explicit control over actions when an access exception occurs, multiple delay count and control fields. The addition of options such as these is intended to be within the scope of this invention.

In addition while the unit shown thus far is single image (only one set of states) it is also possible to build a unit that can sequence through multiple separate accesses, this is equivalent to providing multiple units. To provide the multiple images multiple copies of some or all of the state information in the LDM/STM unit are provided, in this case additional control information would be provided either as part of the instruction or in the control register to specify which unit this instruction was directed to. It is possible to omit this additional information at the cost of increased control logic. In the case where there is a conflict (i.e. more then one image/unit wants to issue an access in a cycle), a method and hardware for providing prioritization is needed. There are many different techniques known in the art which will not be further described. Note that a conflict is also possible between the LDM/STM unit and it's associated D unit (i.e. both want to issue an access the same cycle), again prioritization is needed here as known in the art.

Turning now to FIG. 1, a simplified drawing of the core of the example CPU plus program and data memories, the basic flow of a LDMX (or STMx) instruction and the associated operation of the CPU will be reviewed. The C6x processor is a VLIW (Very Long Instruction Word) type processor where multiple instructions, grouped together into blocks of 8, are dispatched to the multiple functional units of the VLIW pipeline. For this example we will ignore the instructions which may run in parallel with the LDMx (or STMx). We will also assume that the control register used by the LDMx (and STMX) instruction has already been loaded with the proper information by a load control register instruction (the normal way for a C6x).

The VLIW instruction block addressed by the Fetch PC (program counter) in the Instruction Dispatch/Decode unit 110 is fetched from the program memory 105 into instruction dispatch/decode unit 110, where the component instructions are decoded, scheduled and lastly dispatched to the specific unit and side indicated by the instruction. The C6x has two identical sides A and B, the A side 115A (and the B side 115B) is made up of 4 functional units S, L, M, and D. We will ignore the S, L and M units as they are not relevant to the invention. The A side (for this example) D unit 120 receives the decoded instruction from the Instruction Dispatch/Decode unit 110, along with the Base register and optionally the Offset register (otherwise it receives ucst5 times operand size) from the A side register file. The D unit 120 upon determining that the instruction is directed to the LDM/STM unit 130 will issue control commands to cause the unit to be loaded with the required state (and of course provide the state information) and then activated. Note: one implementing this invention may also wish to provide one or more additional instructions to stop and query the state of the unit or to allow the restarting (and possible reloading) of a stopped unit, more about this later.

Figure 2:
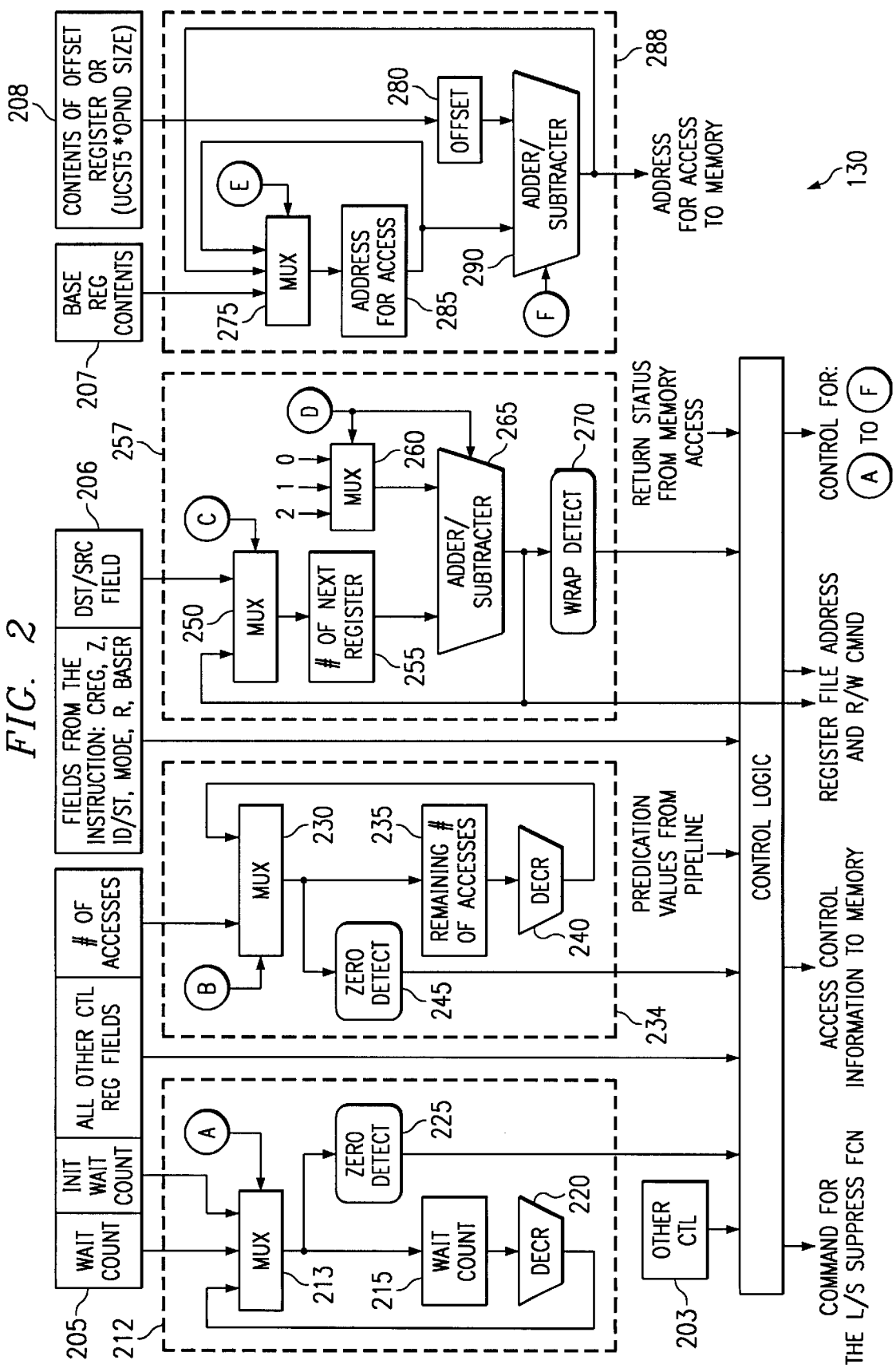
FIG. 2 shows the details of a load multiple/store multiple (LDM/STM) unit of this invention.

FIG. 2 illustrates a design example of the load multiple/store multiple (LDM/STM) unit of this invention. This unit maybe implemented using different logic for the same result. The LDM/STM unit receives the information sent from the associated D unit. It is possible to provide one or more shared LDM/STM units between the A and B sides, this design does not. FIG. 2 includes the following 5 major subsections to the unit. Subsection 210 is the control logic. Subsection 212 is the interaccess delay logic. Subsection 234 tracks the number of accesses to issue. Subsection 257 calculates the next register to use as a source (store) or destination (load). Subsection 288 performs the required address calculation. Control logic 210 is shown here as a single unit for simplicity. In most real systems the control logic would in fact be spread out over the entire LDM/STM unit 130.

This received information (203 to 208) consists of: 203, various control signals/commands from the rest of the CPU; 205, the contents of the associated control register; 206, additional fields from the instruction; 207, the base address register contents; and 208, either the value of a 5 bit unsigned immediate (ucst5) multiplied by the instruction specified operand size or the contents of the offset register. Included in 203 is the order(s) that causes the control logic 210 to direct the multiplexers 213, 230, 250, 275 to load the appropriate values into registers 215, 235, 255, 285 and enables loading of register 280. After the initial load of state information control logic 210 causes the initial wait count to be decremented each cycle following the one where it was loaded into wait count register 215. The decrement operation is performed by decrementer 220 which subtracts one from the wait count each cycle, and multiplexer 213 which selects this value to be reloaded into register 215. Zero detect unit 225 signals control logic 210 when the initial wait is over (i.e. the count went to zero). The first access should then be issued. The next instruction cycle, control logic 210 tells multiplexer 213 to load the register 215 with the wait count portion of 205. This same cycle control logic 210, if the predication result indicates the access should continue, sends the access control information to the data memory along with the address (the output of adder/subtractor 290). Control logic 210 directs multiplexer 275 to load the address value back into register 285. If control logic 210 determines that the operation should continue, then the read (store) or write (load) command and the register file address are sent to the register file.

The following table shows the output of control logic 210 to multiplexer 260 and adder/subtractor 265 for each access and each Register access sequencing Field value. Note in this table a prefix of: + means add and − means subtract.

| Register access sequencing | First access (no wrap) | Second access (no wrap) | Third access (no wrap) | Accesses before wrap is reached | Access when wrap is reached | Accesses after wrap is reached |
|---|---|---|---|---|---|---|
| 000: Don't change register number | +0 | +0 | +0 | +0 | +0 | +0 |
| 001: Ping-Pong between 2 sets | +0 | +1 | −1 | See note 1 | See note 1 | See note 1 |
| 010: Decr. register number, no wrap | +0 | −1 | −1 | −1 | +0 | +0 |
| 011: Incr. register number, no wrap | +0 | +1 | +1 | +1 | +0 | +0 |
| 100: Decr. register number, wrap back to dst/src | +0 | −1 | −1 | −1 | Reload dst/src | −1 |
| 101: Incr. register number, wrap back to dst/src | +0 | +1 | +1 | +1 | Reload dst/src | −1 |
| 110: Decr. register number, wrap around to 15 | +0 | −1 | −1 | −1 | −1 | −1 |
| 111: Incr. register number, wrap around to 0 | +0 | +1 | +1 | +1 | +1 | +1 |

Note 1: If access is even numbered then +1, if odd then −1
Note 2: If the operand size is doubleword then replace +1 with +2, and −1 with −2

So at this point the access command has been issued to the data memory, the associated register number and command have been passed to the register file, and the updated address loaded into register 285. In addition decrementer 240 decrements the contents of register 235 (remaining number of accesses) this quantity is then reloaded into register 235 by multiplexer 230. If zero detect unit 245 detects the number of remaining accesses is zero, then the operation (instruction) is finished and the unit cleans up and shuts off. In the case of a unit supporting multiple images, then only the image in question is affected.

The predication result specified in the prior paragraph is developed by control logic 210 from information provided in 205 (Predication Control field) and 206 (z and creg fields) along with a set of signals provided from either the register files or the associated D unit indicating if the contents of a specific predication register is zero this cycle. If Predication Control specifies that a data write occurring this cycle should be predicated and the predication fails (i.e. the write needs to be suppressed) then control logic 210 sends a signal to the load/store suppress function 140 (FIG. 1) to disable the write. Note that in the simplest implementation of the load/store suppress function 140 is a simple set of combinatorial gates that allows the suppress command/signal to override the normal write enable provided to the memory or register file.

When either a stop condition is detected or the number of accesses left goes to zero, then the control logic 210 shuts down the LDM/STM unit after cleaning up its internal state (if needed). If the Base register update control field indicates that the base register should be updated, then control logic 210 issues the proper commands to do it. In this implementation there is a bypass path which is not shown in either figure that can take the address output of adder/subtractor 290 (which performs a pass A operation, i.e. pass through the address and ignore the offset) and direct it to a write port of the proper register file. In addition, the baseR field value and a write (register) command are presented along with the updated address from 290.

We will now address the handling of special cases and options by the LDM/STM unit, still using FIG. 2.

Subsection 212, the interaccess delay logic, does zero detection on the initial load of register 215. If either the wait count or the initial wait count are 0 then the control logic 210 will ignore the result of the decrementer 220 (that cycle) and just reload the wait count value. This of course results in an interaccess wait period of zero cycles. If the Issue delay control field specifies delay every other issue, then the following cycle after an access is issued because the interaccess delay went to zero, control logic 210 will ignore the actual output of zero detect unit 225 and instead pretend the output was zero detected, thus initiating the second access (unless number of accesses went to zero in the prior cycle, in which case we would stop and clean up). Note this will also cause all other subsections to cycle as if this was a normal (i.e. due to wait count zero) access.

Subsection 234, which keeps track of number of accesses left to issue, also does zero detection on the initial load of register 235. For the special case where the initial value of the number of accesses field is zero (infinite count), this case is detected at the time the value is initially loaded into register 235 by zero detect unit 245 which informs control logic 210 of the condition. In this case control logic 210 ignores the number of accesses field (actually it ignores any further triggering by zero detect unit 245) and thus runs till a stop condition is reached.

If the Address change control field specifies no address update then control logic 210 tell multiplexer 275 to keep reloading register 285 from the output of register 285, instead of loading from the output of adder/subtractor 290.

It is possible (and preferred) to make the LDM and STM instructions restartable in the case of an external interrupt (such as an I/O interrupt or timer tick) or some access exceptions (such as a page fault). Note: if it is not possible to make the instructions restartable then interrupts should be disabled when this unit is in use. To make the instructions restartable all saved state (that state which needs to be kept intercycle) in the unit should be readable and writable by the CPU, such as by mapping it all onto control registers or adding Load and Store LDM/STM state instructions. In addition a method of restarting the unit needs to be provided. An example of how this would work is provided below.

The LDM/STM unit, which is active, receives notification that an external interrupt has been received by the CPU. Control logic 210 checks the value of the stop control field and see that a stop on external interrupt is called for, if so it stops.

The central processing unit starts processing the interrupt code stream which checks the state of the LDM/STM unit and sees it was active. If the interrupt code needs the LDM/STM unit, it saves the contents of LDM/STM the unit into the saved state information of the interrupted routine. If the interrupt code does not need the LDM/STM unit, it will return to the interrupted routine and no save/restore is needed).

The interrupt code finishes and reloads the LDM/STM unit from the saved state information of the interrupted routine, or the interrupt code goes to the dispatcher which sometime later reinvokes the routine (again the saved state is reloaded).

The interrupt (or dispatcher) code issues a restart order (which may have an initial delay value associated with it) to the LDM/STM unit and returns from the interrupt (or branches to the return point).

The interrupted code continues running till it done or interrupted again.

While not detailed above it is desirable to have a way to enable and disable the LDM/STM unit, this could be done in a number of ways known in the art, such as: two instructions the first to enable and the other to disable the unit, or a bit in a control register which if 0 then the unit is disabled or if 1 then the unit is enabled (the preferred method). Along with this function adding an interrupt to trap attempts to use the unit when it is disabled is desirable.

The preferred embodiment provides two additional control registers that allow the reading and writing of the internal (interaccess) state of the LDM/STM unit. Thus to save the entire state of the LDM/STM unit these two and the control register used as a part of the instruction need to be saved and later restored. The first register contains the contents of register 285, the address for access register. The contents of the unit other control register is as follows:

Bits Field and meaning

31: Number_of_accesses_is_infinite: Set when the initial value of the Number of accesses to issue field is 0, i.e. infinite number of accesses.

30: Even_access: Set on even accesses, i.e. every other cycle, used for ping-pong register addressing 29: In_shutdown_mode: Set between the time that the unit detects the need to stop and when it actually stops.

28: Wait_count_was_0_last_cycle: Set if in the prior cycle the wait_count logic detected that the count went to 0 last cycle or to pretend that it did.

27: In_initial_count phase: Set between the time the unit is activated and the first access is issued.

26–22: Contents of register 255, number of next register

21–16: Contents of wait count register 215

15–12: Store pipeline model, 2 bits, one per cycle of store latency, a bit is set if a store was issued by this unit in that cycle.

11–8: Load pipeline model, 4 bits, one per cycle of load latency, a bit is set if a load was issued by this unit in that cycle.

7–0: Contents of register 235, number of accesses remaining

The disclosure so far has omitted the ability to handle stalls from memory, the C6x has only one stall condition, which is a bank conflict in the data memory 135. The C6x has a pseudo-dual ported data memory, where two different access can be satisfied in one cycle as long as they address data different banks. If both accesses attempt to access the same bank (or for some implementations different lines in the same bank) then one will stall for a cycle while the other does it's access. In this case the stall is transmitted to all units of the processor and cause operation to suspend for a cycle while the second access occurs. When the LDM/STM unit is added it too will suspend for a cycle like any other unit, but in addition it is now possible to have three access to the same bank in one cycle (one each from the two D units and one from the LDM/STM unit) when this occurs two cycles of suspension (stall) occur instead of one. Most other CPUs have more complex stalls, in which case the stall logic needs be more complex, but as type of functionality is known in the art it will not be addresses further, except to note that proper handling of stalls may require adding buffering or rollback hardware to the unit, again this type of function is known in the art.

In addition to the examples described herein, still other examples will be appreciated by one skilled in the art. Thus, while the present embodiments have been described in detail, various substitutions, modifications or alterations could be made to the descriptions set forth above without departing from the inventive scope which is defined by the following claims.

What is claimed is:

1. A data processor operating in instruction cycles including:

a data memory having a plurality of address locations, a plurality of data registers, an instruction dispatch/decode unit responsive to a stream of instructions to decode instructions and activate corresponding functional units, said stream of instructions including at least one normal memory access instruction and at least one multiple cycle memory access instruction;

a normal memory access unit connected to said data memory, said plurality of data register and said instruction dispatch/decode unit for data transfer between a predetermined address location of said data memory and a predetermined one of said data registers, said normal memory access unit initiating data transfer during an instruction cycle of actuation by said instruction dispatch/decode unit in response to a normal memory access instruction;

a multiple cycle memory access unit connected to said data memory, said plurality of data registers and said instruction dispatch/decode unit for data transfer between a predetermined address location of the data memory and a predetermined one of the data registers, the multiple cycle memory access unit delaying a predetermined number of instruction cycles between activation by said instruction dispatch/decode unit in response to a multiple cycle memory access instruction and initial data transfer;

wherein the multiple cycle memory access unit performs the data transfers independently and in parallel with the data processor's instruction flow, once the multiple cycle memory access unit has been activated.

2. The data processor of claim 1, wherein the multiple cycle memory access unit data transfer is a load, from the data memory to the data registers.

3. The data processor of claim 1, wherein the multiple cycle memory access unit data transfer is a store, from the data registers to the data memory.

4. The data processor of claim 1, wherein the operations of the multiple cycle memory access unit are subject to predication on an instruction specified one of said data registers, whereby the operation subject to predication aborts upon a predetermined state in the instruction specified data register.

5. The data processor of claim 4, wherein the multiple cycle memory access unit operations subject to predication are data accesses.

6. The data processor of claim 4, wherein the multiple cycle memory access unit operations subject to predication are data writes.

7. The data processor of claim 4, wherein the multiple cycle memory access unit operations subject to predication are both data accesses and data writes.

8. The data processor of claim 4, wherein the multiple cycle memory access unit aborts the operation on predication failure and continues with the next operation.

9. The data processor of claim 4, wherein the multiple cycle memory access unit aborts the operation on predication failure and stops operation.

10. The data processor of claim 1, wherein the multiple cycle memory access unit aborts operation and stops on a predetermined event.

11. The data processor of claim 10, wherein the predetermined event is an external interrupt.

12. The data processor of claim 10, wherein the predetermined event is an internal interrupt.

13. The data processor of claim 10, wherein the predetermined event is a forward branch taken.

14. The data processor of claim 10, wherein the predetermined event is a subroutine call.

15. The data processor of claim 1, wherein the multiple cycle memory access unit's internal state is saved into instruction visible and alterable memory when the unit aborts operation and stops.

16. The data processor of claim 15, where the instruction visible memory is control registers.

17. The data processor of claim 1, wherein the multiple cycle memory access unit can be enabled and disabled.

18. The data processor of claim 17, wherein the multiple cycle memory access unit is enabled and disabled via instructions.

19. The data processor of claim 15, wherein the multiple cycle memory access unit is enabled and disabled via bits in a control register.

20. The data processor of claim 1, wherein the multiple cycle memory access unit is loaded and activated by special instructions.

21. The data processor of claim 1, wherein the multiple cycle memory access unit is loaded and activated by normal instructions in a special mode.

22. A data processor operating in instruction cycles including:
    a data memory having a plurality of address locations,
    a plurality of data registers,
    an instruction dispatch/decode unit responsive to a stream of instructions to decode instructions and activate corresponding functional units, said stream of instructions including at least one multiple cycle memory access instruction;
    a multiple cycle memory access unit connected to said data memory, said plurality of data registers and said instruction dispatch/decode unit for data transfer between a predetermined address location of the data memory and a predetermined one of the data registers, the multiple cycle memory access unit delaying a predetermined number of instruction cycles between activation by said instruction dispatch/decode unit in response to a multiple cycle memory access instruction and initial data transfer;
    wherein the multiple cycle memory access unit executes a predetermined number of data transfers in response to a single activation by said instruction dispatch/decode unit.

23. The data processor of claim 22, wherein the multiple cycle memory access unit delays a predetermined number of instruction cycles between sequential data transfers of the predetermined number of data transfers.

24. The data processor of claim 23, wherein the predetermined period is the same as the initial delay.

25. The data processor of claim 23, wherein the predetermined period is independent of the initial delay.

26. The data processor of claim 22, wherein the multiple cycle memory access unit provides predetermined register number cycling among said plurality of data registers.

27. The data processor of claim 26, wherein the register number cycling is between an instruction specified data register and a data register having a next greater register number.

28. The data processor of claim 26, wherein the register number cycling is between two register pairs, a first register pair consisting of an instruction specified data register and a data register having a next greater register number and a second register pair consisting of a data register having a register number two greater than the instruction specified data register and a data register having a register number three greater than the instruction specified data register.

29. The data processor of claim 26, wherein the register number cycling begins with an instruction specified data register and employs a data register having a next greater register number each following register access until a data register having a largest register number is reached.

30. The data processor of claim 26, wherein the register number cycling begins with an instruction specified data register and employs a data register having a next smaller register number each following register access until a data register having a smallest register number is reached.

31. The data processor of claim 26, wherein the register number cycling begins with an instruction specified data register, employs a data register having a next larger register number each following register access until a data register having a largest register number is reached, and employs a data register having a smallest register number following access to the data register having the largest register number.

32. The data processor of claim 26, wherein the register number cycling begins with an instruction specified data register, employs a data register having a next smaller register number each following register access until a data register having a smallest register number is reached, and employs a data register having a largest register number following access to the data register having the smallest register number.

* * * * *